Patented Dec. 5, 1933

1,938,059

UNITED STATES PATENT OFFICE 1,938,059

DERIVATIVES OF THE BENZANTHRONE-PYRAZOLANTHRONE SERIES AND A PROCESS OF PREPARING THEM

Karl Wilke, Josef Stock, and Fritz Schubert, Frankfort-on-the-Main-Hoechst, Germany, assignors to General Aniline Works, Inc., New York, N. Y., a corporation of Delaware No Drawing. Application November 12, 1929, Serial No. 406,726, and in Germany December 1, 1928

16 Claims. (Cl. 260—45)

Our present invention relates to derivatives of the benzanthrone-pyrazolanthrone series and to a process of preparing them.

We have found that substituted amino groups can easily be introduced into the molecule of the benzanthrone-pyrazolanthrones by causing, quite generally, organic nitrogen-containing compounds which contain at least one reactive hydrogen atom attached to nitrogen and which correspond to the following general formula:

wherein X stands for hydrogen, aryl or alkyl and R for alkyl, aryl, aralkyl or acyl or X and R together with the NH-group may form a heterocyclic ring system, to act upon negatively substituted benzanthrone-pyrazolanthrones. As such products there may chiefly be used the halogen- or nitro derivatives of the benzanthrone- or pyrazolanthrone which may, for instance, be obtained by halogenation or nitration of benzanthrone-pyrazolanthrones or by synthesis.

The condensation is effected according to known methods, i. e. generally in the heat by using a suitable solvent of high-boiling point in the presence of an acid-binding agent and an agent accelerating the reaction, such as sodium acetate, copper carbonate, cuprous chloride or the like. In some cases, of course, the amine used as reaction component at the same time has a dissolving and an acid-binding action. In the presence of volatile substances it is necessary to work in a closed vessel under pressure.

Furthermore we have found that the same or similar derivatives of the benzanthrone-pyrazolanthrone are obtained by causing amino-benzanthrone-pyrazolanthrones to react with such compounds as are known by experience to have a substituting action upon the hydrogen attached to nitrogen. Compounds of this kind are, for instance, acid anhydrides, acid-halides, negatively substituted, especially halogen-containing, compounds of the most different classes of bodies, aldehydes, quinones etc. The amino-benzanthrone-pyrazolanthrones used as starting materials can, for instance, be prepared by synthesis (cf. U. S. patent application Ser. No. 216,-338, filed on August 29, 1927 in the name of Karl Wilke) or by nitration of the benzanthrone-pyrazolanthrones and subsequent reduction. Their conversion into the new compounds containing substituted amino-residues is effected according to known methods i. e. generally by using a suitable solvent and, if desired, by adding one of the usual condensing agents such, for instance, as sodium acetate and a catalyst, such as copper carbonate, copper acetate, cuprous chloride or the like. In certain cases one or the other of these admixtures may be dispensed with. Thus one of the reaction components may at the same time act as a solvent or the reaction takes place so easily that the addition of a condensing agent or a catalyst is unnecessary.

The benzanthrone-pyrazolanthrone derivatives, prepared according to the said processes, contain the following ring system:

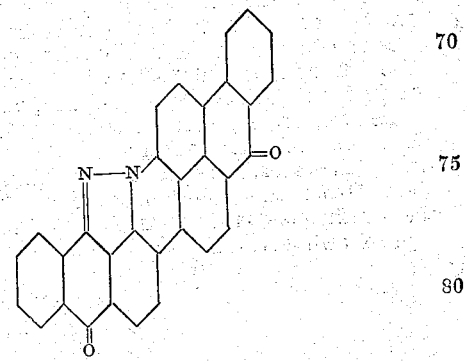

and are at least once substituted by the residue

wherein $X_1$ stands for hydrogen, alkyl, aralkyl or aryl, $X_2$ for acyl, alkyl, aralkyl or aryl or $X_1$ and $X_2$ together with the N-atom for a heterocyclic ring system. They are, in many cases, as such valuable vat dyestuffs or intermediate products of value for the preparation of new dyestuffs.

The following examples serve to illustrate our invention, but they are not intended to limit thereto; the parts being by weight:

(1) 20 parts of amino-benzanthrone-pyrazolanthrone (obtained by nitration of benzanthrone-pyrazolanthrone and subsequent reduction) and 10 parts of acetic anhydride are boiled in the reflux apparatus for 5 hours in 200 parts of nitrobenzene. The solution which is at first green rapidly assumes a more bluish color. After cooling the precipitated product is filtered, washed first with nitrobenzene and then with alcohol and dried. The acetamino-benzanthrone-pyrazolanthrone thus obtained which probably has the following constitution:

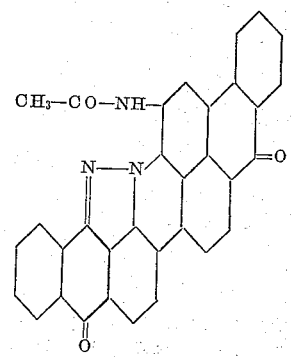

represents a violet-blue powder with a greenish-blue streak on cooling, it precipitates from boiling nitrobenzene in the form of blue, minute crystals. The unaltered acetamino compound dissolves in cold concentrated sulfuric acid to a red solution from which it is precipitated by means of water in the form of blue flakes. When heating, however, the sulfuric acid solution, saponification into the green amino-compound sets in. In a blue alkaline hydrosulfite vat cotton is dyed greenish-blue tints.

(2) 20 parts of amino-benzanthrone-pyrazolanthrone (cf. Example 1), 10 parts of benzoyl-chloride and 200 parts of nitro-benzene are heated to boiling in the reflux apparatus until the mixture, which is green, at first has turned brilliant greenish-blue and does not change anymore. The solution is then allowed to cool, filtered, washed and dried. A dark-blue powder is obtained which dissolves in concentrated sulfuric acid to a brownish-wine-red solution. On diluting with water, greenish-blue flakes are precipitated from this solution. The benzoyl-amino-benzanthrone-pyrazolanthrone probably having the following formula:

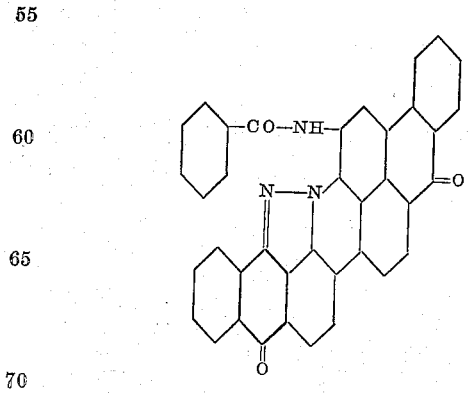

dyes cotton in a blue vat greenish-blue tints.

(3) 23.1 parts of amino-benzanthrone-pyrazolanthrone (cf. Example 1), 3.5 parts of tri-cyanogen chloride and 0.5 parts of cuprous chloride in 250 parts of dry nitrobenzene are heated to boiling for 6 hours, while stirring. The evolution of hydrochloric acid gas, which is intense in the beginning of the operation, already decreases after about an hour and the mixture which is at first green turns blue. After cooling, the mass is filtered, washed out with nitrobenzene, benzene and alcohol and dried. The product thus obtained represents a bluish-black powder which dissolves in concentrated sulfuric acid to a brownish-violet solution. It dyes cotton in a blue vat bluish-green tints. On after-treatment with hypochlorite these dyeings become more turbid.

(4) 25 parts of amino-benzanthrone-pyrazolanthrone (cf. Example 1) and 25 parts of finely subdivided tri-sodium phosphate in 350 parts of nitrobenzene are heated, while stirring, until the small quantity of water is removed. After addition of 25 parts of dimethyl-sulfate the mass is then stirred for one hour at a temperature of 170° C. The reaction mixture which is at first green turns bluish-violet and subsequently bluish-grey. After cooling the mass is brought on a filter and washed out with nitrobenzene, alcohol and water. At this operation the paste thus obtained again turns green and, after drying, a black powder is obtained. The product dissolves in concentrated sulfuric acid to a wine red solution. The dyestuff dyes cotton in a blue vat green tints which, when chlorinated, become only a little more olive greenish. There is probably obtained a mono- or dimethylamino-benzanthrone-pyrazolanthrone.

(5) By boiling for 5 hours in the reflux apparatus 2 parts of amino-benzanthrone-pyrazolanthrone (cf. Example 1) with 1 part of benzyl-chloride in 20 parts of nitrobenzene and working up in the usual manner a black powder is obtained which dissolves in concentrated sulfuric acid to an olive-brown solution and dyes cotton in a blue vat greyish-green tints. It probably has the following constitution:

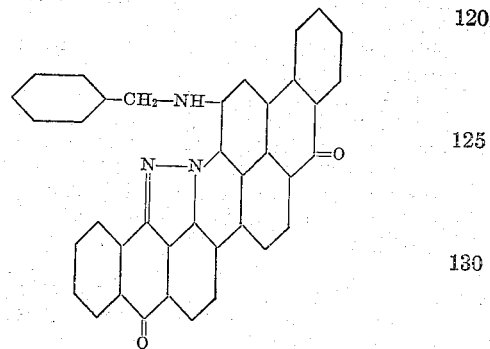

(6) 10 parts of amino-benzanthrone-pyrazolanthrone (cf. Example 1), 6 parts of 1-chloro-anthraquinone, 4 parts of dry sodium acetate and 2 parts of copper acetate in 100 parts of nitrobenzene are heated to boiling for 8 hours, while stirring. The mixture having at first a green color by and by turns greyish-blue. The mass is allowed to cool and the condensation product is obtained in the usual manner in the form of a black powder which dissolves in concentrated sulfuric acid to a turbid green solution from which it is precipitated by means of water in the form of olive black flakes. It dyes cotton in a bluish-grey alkaline hydrosulfite vat greenish-grey tints of good fastness to washing. It probably has the following constitution:

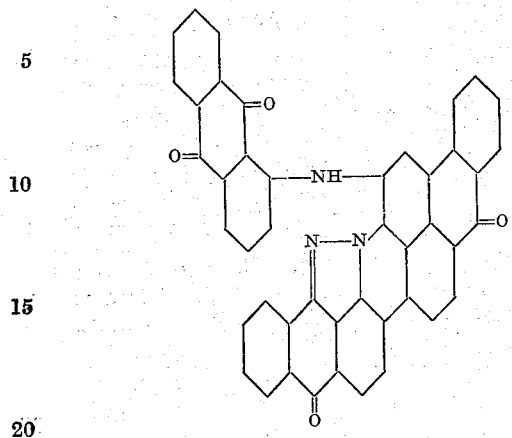

(7) A similar dyestuff which dissolves in sulfuric acid to a yellowish-green solution and dyes cotton in a bluish-grey vat olive tints, is obtained by boiling for 8 hours 23 parts of amino-benzanthrone-pyrazolanthrone (cf. Example 1), 6.9 parts of 1.5-dichloroanthraquinone, 15 parts of sodium acetate and 5 parts of copper carbonate in nitrobenzene. The difficultly soluble product for the most part precipitates from the reaction mixture already during the operation. It probably has the following constitution:

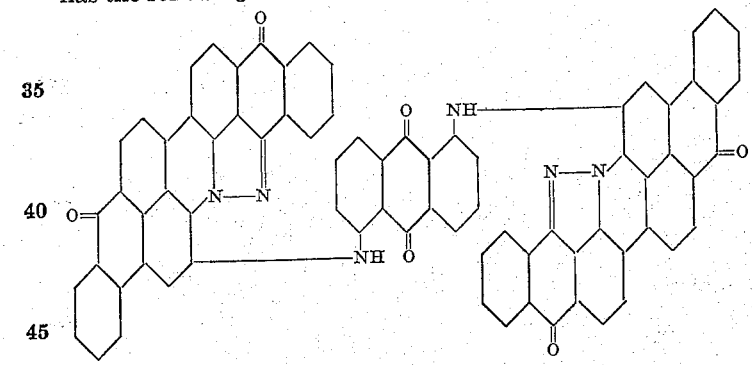

(8) By condensation of equimolecular quantities of pyrazolanthrone and dibromo-benzanthrone, melting at 256 C. (according to the process of U. S. patent application Ser. No. 349,265, filed on March 22, 1929 in the name of Karl Wilke) a mono-bromo-Bz-1-benzanthronyl-Py-1-pyrazolanthrone of the melting point of the raw material i. e. 367° C. is easily obtained. In the melt of potassium hydroxide this intermediate product can be converted, according to the process of U. S. patent application Ser. No. 216,338, filed on August 29, 1927 in the name of Karl Wilke, into a mono - bromo - benzanthrone - pyrazolanthrone which dissolves in sulfuric acid of 96 per cent strength to a reddish-violet solution and in mono-hydrate to a violet-blue solution. By stirring for 16 hours at boiling temperature 10.5 parts of this synthetic bromo-benzanthrone-pyrazolanthrone, 9.3 parts of amino-benzanthrone-pyrazolanthrone (cf. Example 1), 10 parts of dry sodium acetate and 5 parts of copper carbonate in 350 parts of nitrobenzene and then proceeding as above indicated, a dyestuff is obtained in the form of a brownish-black powder of a greyish-blue streak. It probably has the following constitution:

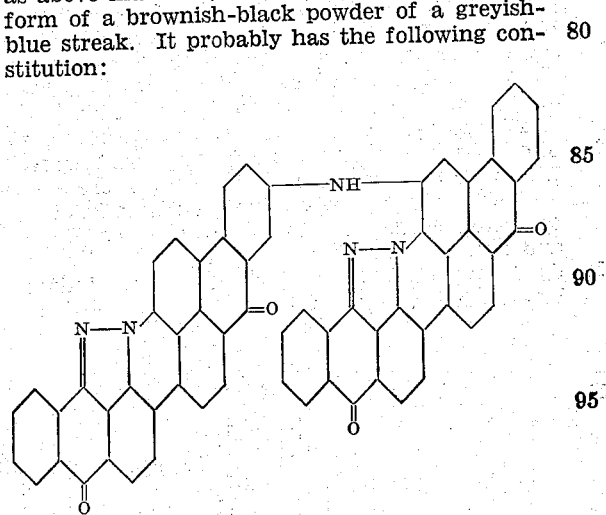

and dissolves in concentrated sulfuric acid to a blackish-violet solution. In a greenish-blue alkaline hydrosulfite vat it dyes cotton a bluish-grey shade of very good fastness properties.

(9) By replacing in Example 8 the amino-benzanthrone-pyrazolanthrone, obtained by nitration of benzanthrone-pyrazolanthrone and subsequent reduction, by the synthetic amino-benzanthrone-pyrazolanthrone (prepared by condensation of pyrazolanthrone with nitrated bromo-benzanthrone, reduction and subsequent treatment in a melt of potassium hydroxide according to the process of U. S. patent application Ser. No. 216,338 filed on August 29, 1927 in the name of Karl Wilke) a bluish-grey dyestuff paste or a black dyestuff-powder is obtained which dissolves in concentrated sulfuric acid to a violet-brown solution and likewise dyes cotton in a blue vat very fast greyish-blue tints. It probably has the following constitution:

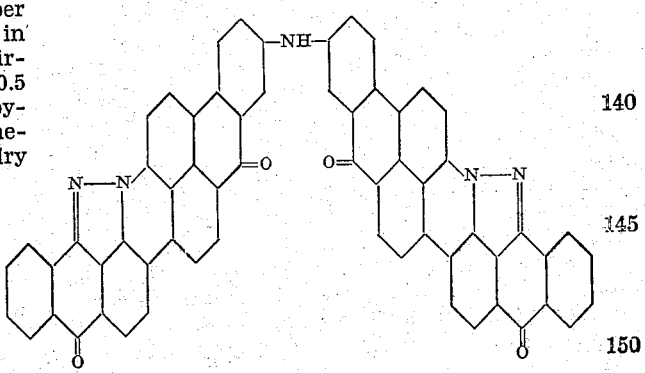

(10) 46.1 parts of amino-benzanthrone-pyrazolanthrone (cf. Example 1), an equimolecular quantity (51.5 parts) of dichloro-benzanthrone-pyrazolanthrone (obtained by chlorinating benzanthrone-pyrazolanthrone by means of sulfuryl chloride according to Example 1 of the U. S. patent application referred to in the preceding example), 51 parts of dry sodium acetate and 17 parts of copper carbonate in 1,200 parts of nitrobenzene are heated to boiling for 16 hours. The product, after being worked up, represents a black dyestuff powder which dissolves in concentrated sulfuric acid to a violet-brown solution and forms a greenish-blue vat in which cotton is dyed a very fast bluish-grey shade. The product has the following formula:

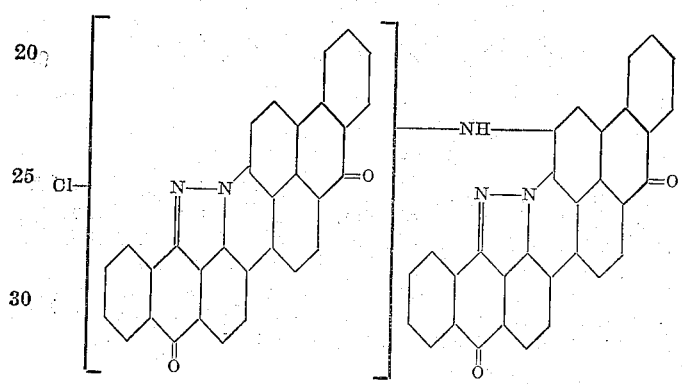

(11) By using in Example 10 the double quantity of the amino-benzanthrone-pyrazolanthrone, so that 2 molecules of the amino compound act upon 1 molecule of the dichloro-benzanthrone-pyrazolanthrone a bluish-grey vat dyestuff is obtained which is very similar to that obtained according to Example 10.

(12) 18.5 parts of amino-benzanthrone-pyrazolanthrone (cf. Example 1), 6.5 parts of a hexachloro-benzanthrone-pyrazolanthrone (obtained according to the U. S. patent application referred to in Example 9 by causing chlorine to act upon benzanthrone-pyrazolanthrone in chloro-sulfonic acid in the presence of iodine until 6 chlorine atoms have been absorbed, which product dissolves in concentrated sulfuric acid of 96 per cent strength to an olive-brown solution) are heated to boiling for 3 hours in nitrobenzene, while adding 10 parts of dry sodium acetate and 5 parts of copper carbonate. The green mixture rapidly turns bluish-grey and the very difficultly soluble condensation product precipitates almost entirely. After filtering, washing and drying, a black powder is obtained, which dissolves in concentrated sulfuric acid to an olive solution. It dyes cotton in a bluish-green vat an olive-grey shade.

(13) 46 parts of amino-benzanthrone-pyrazolanthrone (cf. Example 1), 48 parts of a monochloro-benzanthrone-pyrazolanthrone, (prepared by causing chlorine to act at a temperature of 170° C. upon benzanthrone-pyrazolanthrone in nitrobenzene which product dissolves in concentrated sulfuric acid to a pure green solution), 50 parts of dry sodium acetate and 10 parts of copper carbonate in 1000 parts of nitrobenzene are stirred for 8 hours at boiling temperature. The mass is further worked up whereby a brownish-black powder is obtained, which dissolves in concentrated sulfuric acid to an olive-green solution and dyes cotton in a blue vat deep grey tints.

(14) 23 parts of amino-benzanthrone-pyrazolanthrone (cf. Example 1), 13 parts of 1-amino-anthraquinone-2-aldehyde and 300 parts of nitrobenzene are boiled for 8 hours in the reflux apparatus, while heating, in such a way that the water formed thereby can distil off. A very difficultly soluble condensation product separates. It is washed on a filter with nitrobenzene, glacial acetic acid and water, then dried and represents a loose brown crystalline powder with a greyish-violet streak. The pulverized crystals have under the microscope a brilliant violet coloration. On diluting in concentrated sulfuric acid the condensation product is again decomposed into its components wherefrom it is to be concluded that the product obtained is an azo-methine of the following constitution:

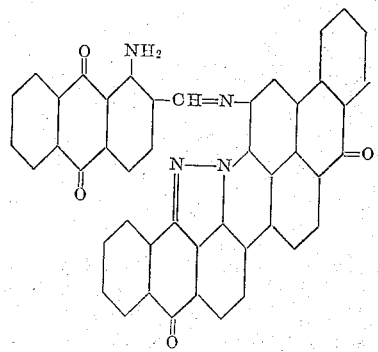

Also in the alkaline hydrosulfite vat it does not seem to be stable. But it is valuable as intermediate product.

(15) 10 parts of amino-benzanthrone-pyrazolanthrone (cf. Example 1) and 12 parts of 1,4-naphthoquinone in 150 parts of nitro-benzene are heated for 15 hours in the reflux apparatus. After cooling, the mass is filtered, washed with nitrobenzene and alcohol and dried. The product is a bluish-black powder which dissolves in concentrated sulfuric acid to a wine-red solution, from which it is precipitated by means of water in the form of dark green flakes. It dyes cotton in a blue vat greyish-green tints.

(16) 105 parts of mono-bromo-benzanthrone-pyrazolanthrone (obtained by condensing pyrazolanthrone with dibromobenzanthrone melting at 256° C.), 50 parts of 1-amino-anthraquinone, 50 parts of anhydrous sodium acetate and 20 parts of copper carbonate in 3000 parts of dry nitrobenzene are heated to boiling for 12 hours, while stirring. The color of the mixture first turns olive-green and subsequently bluish-grey, and the condensation product separates. After cooling, the mass is filtered and washed with nitrobenzene, alcohol and water. The copper salt which is still present is removed by boiling out with dilute hydrochloric acid, and the mass is filtered again and washed until neutral. The dyestuff thus obtained which probably has the following constitution:

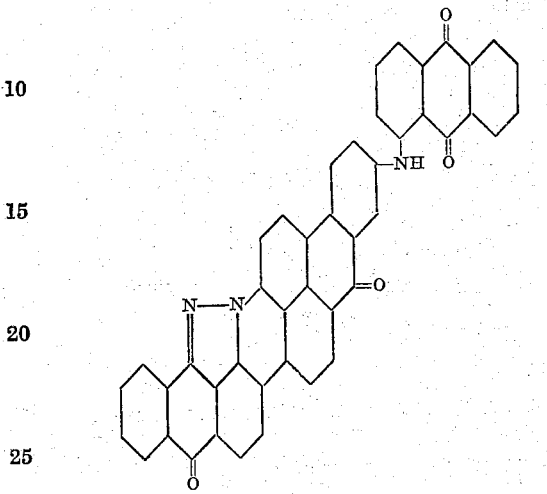

represents a reddish-violet paste and in a dry state a dark powder which dissolves in concentrated sulfuric acid to a green solution from which it is precipitated by means of water in the form of bluish-grey flakes. The dyestuff dyes cotton in a bluish grey alkaline hydrosulfite vat bluish-grey tints of an excellent fastness.

(17) By replacing in the preceding example the 1-amino-anthraquinone by 2-amino-anthraquinone a dyestuff is obtained which dyes cotton in a greyish-blue vat very fast blue tints and probably has the following constitution:

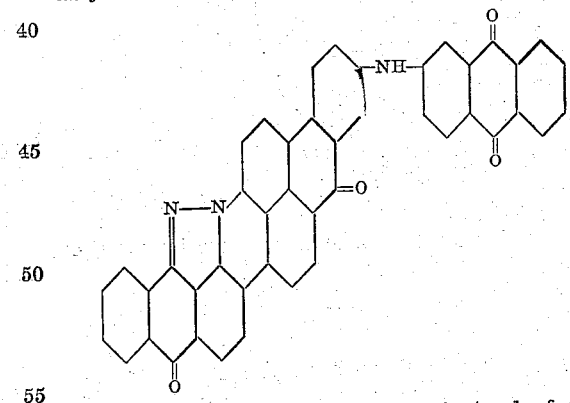

(18) By using in Example 16, instead of the synthetic mono-bromo-benzanthrone-pyrazolanthrone used therein, a mono-bromo-benzanthrone-pyrazolanthrone which has been prepared by causing bromine in a sodium bromide solution to act upon the aqueous paste of the benzanthrone-pyrazolanthrone, a dyestuff is obtained dyeing cotton in a blue vat likewise fast bluish-grey tints. This product dissolves in concentrated sulfuric acid to a dark green solution, from which on diluting with water bluish-grey flakes are precipitated.

(19) 105 parts of dichloro-benzanthrone-pyrazolanthrone (obtained by chlorinating by means of sulfuryl chloride at 60° C.–70° C. benzanthrone-pyrazolanthrone dissolved in nitrobenzene), 100 parts of 1-aminoanthraquinone, 100 parts of dry sodium acetate and 20 parts of copper carbonate in 3000 parts of nitro-benzene are stirred for 15 hours at boiling temperature. After the mass has been worked up in the usual manner a dark-colored powder is obtained which dissolves in concentrated sulfuric acid to a greyish-violet solution from which it is precipitated by means of water in the form of bluish-grey flakes. When added to an alkaline hydrosulfite solution these flakes form a clear blue vat in which cotton is dyed a reddish bluish-grey shade of excellent fastness.

(20) Equimolecular quantities of mono-nitro-benzanthrone-pyrazolanthrone (100 parts), obtained by nitration of benzanthrone-pyrazolanthrone, 1-amino-anthraquinone (50 parts), anhydrous sodium acetate (100 parts) and copper carbonate (20 parts) in nitrobenzene (3500 parts) are stirred for 7 hours at boiling temperature and the product is isolated according to Example 1. In a clear, grey vat cotton is dyed yellowish-green. The dyeings have a good fastness to washing and boiling; when after-treated with hypochlorite, however, they turn more yellowish.

(21) 165 parts of chloro-benzanthrone-pyrazolanthrone (obtained by causing chlorine to act at 135° C.–145° C. upon benzanthrone-pyrazolanthrone in trichlorobenzene, having a content of chlorine of about 17 percent and dissolving in concentrated sulfuric acid to a violet solution), 67 parts of 1-aminoanthraquinone, 200 parts of dry sodium acetate and 10 parts of a copper salt in 3000 parts of nitrobenzene are heated to boiling for 7 hours, while stirring, and, after cooling, worked up in the usual manner. The product is a blue powder which dissolves in sulfuric acid to a bluish-grey solution. It dyes cotton in a blue alkaline hydrosulfite vat intense and clear greenish-grey tints which have excellent fastness properties.

(22) 10 parts of chloro-benzanthrone-pyrazolanthrone, (prepared by causing chlorine to act at 135° C. to 145° C. upon benzanthrone pyrazolanthrone in nitrobenzene, dissolving in concentrated sulfuric acid to a green solution and having a content of chlorine of about 16 per cent) and 30 parts of an alcoholic dimethylamine solution of 46 per cent strength are heated in a closed vessel for about 24 hours to a temperature of 160° C., while adding a small quantity of cuprous chloride. After cooling, the mass is filtered, washed and dried. The dyestuff thus obtained represents a bluish violet powder which dissolves in concentrated sulfuric acid to a green solution. It dyes cotton in a blue vat dull grey tints of very good fastness properties. From the content of chlorine in the product it may be concluded that a mono-chloro-dimethylamino-benzanthrone-pyrazolanthrone is obtained.

We claim:

1. The process which comprises heating a negatively substituted benzanthrone-pyrazolanthrone in the presence of an inert organic solvent with a compound of the following general formula:

R—NH—X wherein X stands for hydrogen and R for methyl, acyl, benzyl or aryl or wherein X and R represent methyl groups.

2. The process which comprises heating a negatively substituted benzanthrone-pyrazolanthrone in the presence of an inert organic solvent and an acid-binding agent with a compound of the following general formula:

R—NH—X wherein X stands for hydrogen and R for methyl, acyl, benzyl or aryl or wherein X and R represent methyl groups.

3. The process which comprises heating a halogen-substituted benzanthrone-pyrazolanthrone in the presence of an inert organic solvent with a compound of the following general formula:

wherein X stands for hydrogen and R for aryl or wherein X and R represent methyl groups.

4. The process which comprises heating a halogen-substituted benzanthrone-pyrazolanthrone in the presence of an inert organic solvent and an acid-binding agent with a compound of the following general formula:

wherein X stands for hydrogen and R for aryl or wherein X and R represent methyl groups.

5. The process which comprises heating a mono-bromo-benzanthrone-pyrazolanthrone with alpha-amino-anthraquinone in the presence of nitrobenzene and sodium acetate while adding a small quantity of copper carbonate.

6. The compound of the following probable formula:

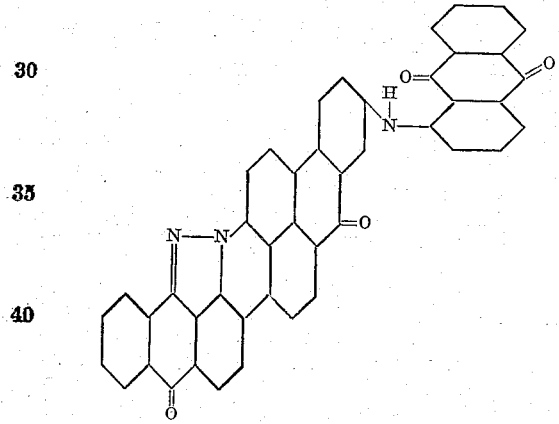

being a dark powder which dissolves in concentrated sulfuric acid to a green solution and dyeing cotton from a bluish-grey vat bluish-grey tints.

7. The compound of the following probable formula:

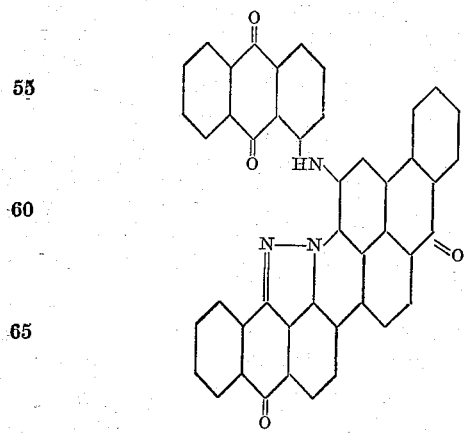

being a black powder which dissolves in concentrated sulfuric acid to a turbid green solution, and dyeing cotton from a bluish-grey vat greenish-grey tints of good fastness to washing.

8. The process which comprises heating a negatively substituted benzanthrone-pyrazolanthrone in the presence of an inert organic solvent with an organic nitrogen-containing compound which contains at least one reactive hydrogen atom attached to the nitrogen atom.

9. The process which comprises heating a benzanthrone-pyrazolanthrone of the following formula:

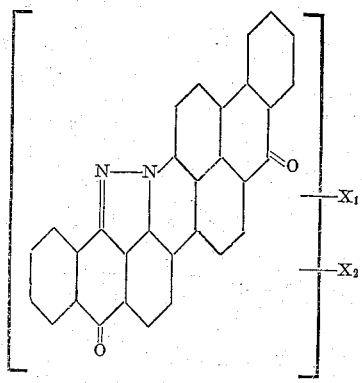

wherein $X_1$ represents chlorine or bromine and $X_2$ represents the same halogen or hydrogen in the presence of an inert organic solvent and an acid binding agent with an amino-anthraquinone.

10. The process which comprises heating dichloro-benzanthrone-pyrazolanthrone with 1-amino-anthraquinone in the presence of nitrobenzene and dry sodium acetate while adding a small quantity of copper carbonate.

11. The compounds containing the following system:

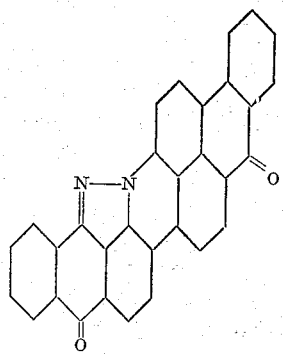

and being at least once substituted by the group

wherein $X_1$ stands for hydrogen and $X_2$ stands for an aryl- or acyl-group or methyl or benzyl or $X_1$ and $X_2$ stand for methyl groups.

12. The compounds of the following general formula:

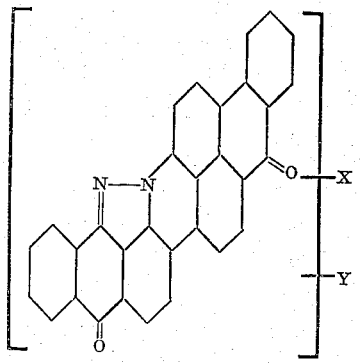

wherein X represents hydrogen or Y, and Y represents a —NH.aryl group.

13. The compounds of the following general formula:

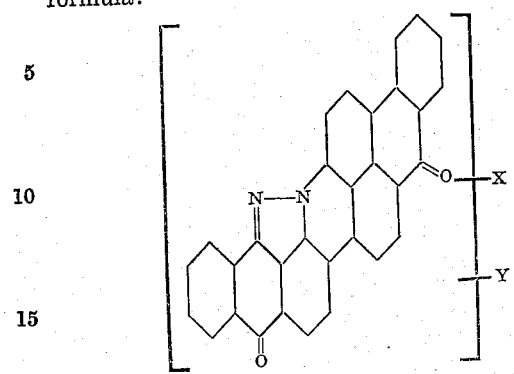

wherein X represents hydrogen or Y, and Y represents a —NH.anthraquinonyl group.

14. The compounds of the following general formula:

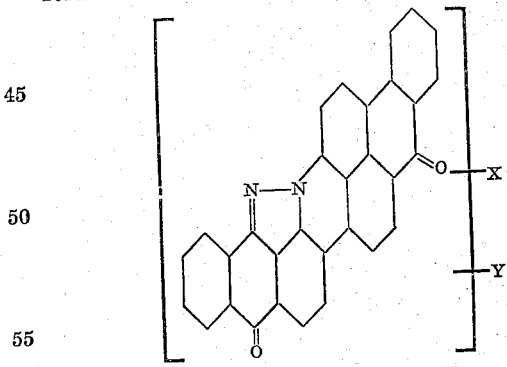

wherein X represents hydrogen or Y, and Y represents the group

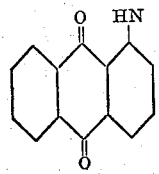

15. The compounds of the following general formula:

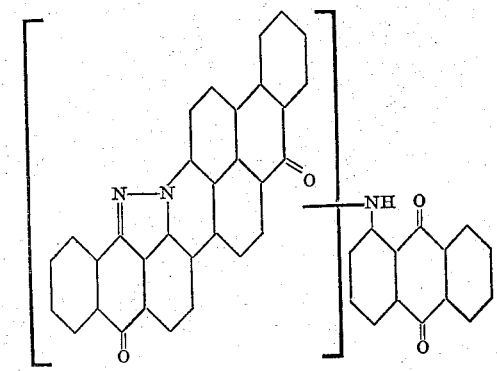

16. The compound of the following formula:

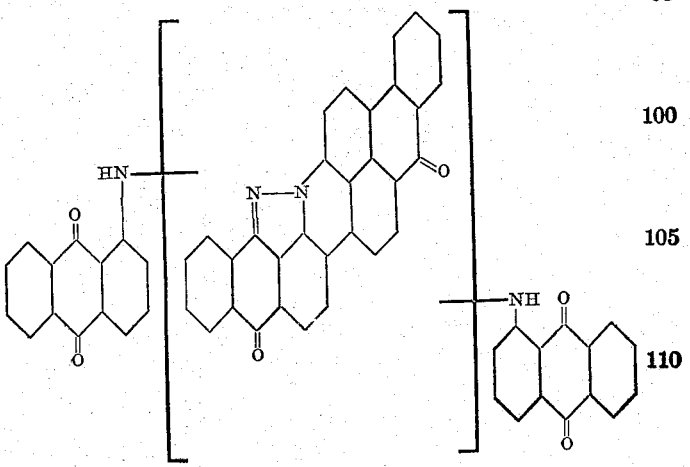

being in the dry state a dark colored powder or, when precipitated by means of water from its solution in concentrated sulfuric acid, bluish-grey flakes and dyeing cotton from a blue vat bluish-grey tints.

KARL WILKE.
JOSEF STOCK.
FRITZ SCHUBERT.